(12) United States Patent
Anderson et al.

(10) Patent No.: US 8,783,114 B2
(45) Date of Patent: Jul. 22, 2014

(54) OCCUPANCY SENSOR

(75) Inventors: David T. Anderson, Hamburg, MN (US); Brian J. Bischoff, Red Wing, MN (US); John L. Ryan, Maple Grove, MN (US)

(73) Assignee: Healthsense, Inc., Mendota Heights, MN (US)

( * ) Notice: Subject to any disclaimer, the term of this patent is extended or adjusted under 35 U.S.C. 154(b) by 291 days.

(21) Appl. No.: 13/183,224

(22) Filed: Jul. 14, 2011

(65) Prior Publication Data
US 2012/0011941 A1  Jan. 19, 2012

Related U.S. Application Data

(60) Provisional application No. 61/364,255, filed on Jul. 14, 2010.

(51) Int. Cl.
*G01L 1/00* (2006.01)
(52) U.S. Cl.
USPC ............................................ 73/781; 600/595
(58) Field of Classification Search
USPC ............ 73/862.627, 763, 768, 774, 862.323, 73/862.473, 862.624, 862.625, 862.626, 73/862.68, 170.08, 170.09, 514.33; 340/573.1, 521, 539.1, 539.23, 523, 340/529, 573.4, 540, 541, 522, 57; 361/760, 761, 764, 752, 807, 704, 700; 705/2, 11
See application file for complete search history.

(56) References Cited

U.S. PATENT DOCUMENTS

| | | | | |
|---|---|---|---|---|
| 3,732,538 | A * | 5/1973 | Gillund et al. | 340/457.1 |
| 4,293,752 | A | 10/1981 | Koenig | |
| 5,276,432 | A * | 1/1994 | Travis | 340/573.4 |
| 5,844,488 | A * | 12/1998 | Musick | 340/573.4 |
| 5,986,357 | A * | 11/1999 | Myron et al. | 307/116 |
| 6,239,706 | B1 * | 5/2001 | Yoshiike et al. | 340/573.4 |
| 6,689,962 | B2 * | 2/2004 | Breed et al. | 177/144 |
| 2003/0009273 | A1 * | 1/2003 | Stanley et al. | 701/45 |
| 2007/0008156 | A1 | 1/2007 | Ueda et al. | |
| 2008/0097250 | A1 | 4/2008 | Tochigi et al. | |
| 2008/0300503 | A1 * | 12/2008 | Lee et al. | 600/534 |
| 2009/0051549 | A1 * | 2/2009 | Tochigi et al. | 340/573.4 |
| 2009/0126513 | A1 * | 5/2009 | Park et al. | 73/862.626 |
| 2009/0315701 | A1 * | 12/2009 | Anderson et al. | 340/539.1 |

FOREIGN PATENT DOCUMENTS

GB  2464965 A  5/2010

OTHER PUBLICATIONS

International Search Report and Written Opinion for related PCT Patent Application PCT/US2011/001231 dated Nov. 7, 2011 (9 pp.).

* cited by examiner

*Primary Examiner* — Hezron E Williams
*Assistant Examiner* — Marrit Eyassu
(74) *Attorney, Agent, or Firm* — Brooks, Cameron & Huebsch, PLLC

(57) ABSTRACT

Embodiments of the present disclosure relate to methods, devices, and systems for determining occupancy of a user. One method to determine occupancy of a user includes sensing a change in resistance of a sensor element of an occupancy sensor, correlating the change in resistance to a force transmitted to the occupancy sensor, and determining an occupancy status of a user based on the force transmitted.

18 Claims, 1 Drawing Sheet

US 8,783,114 B2

OCCUPANCY SENSOR

CROSS REFERENCE

This application is related to, and claims priority to, U.S. Provisional Application No. 61/364,255, filed on Jul. 14, 2010, entitled "BED OCCUPANCY SENSOR," the content of which is hereby incorporated by reference in its entirety.

BACKGROUND

In the field of remote health monitoring, systems have been developed to monitoring the activity of a user in a dwelling. For example, in various systems, an individual's activities can be monitoring using a number of sensors.

Activity monitoring systems include motion sensors, for example, that are connected to a base control system that monitors areas within the dwelling for movement. When a lack of movement is indicated, the system indicates the lack of movement to a remote assistance center that can contact a party to aid the individual. However, not all inactivity indicates that an individual is in need of assistance. For example, an individual can be sitting in a chair for a prolonged period, or lying in bed. These periods may be sufficient to initiate an alert for third party response, but may not actually be an emergency.

Many of the current sensors marketed for the detection of a person occupancy status can be complex, expensive, and line powered, and use a proprietary computer interface for calibration or data collection. Other occupancy detection systems use switch type sensors. The switch type sensors have not been found to be a reliable detection of occupancy as it is difficult if not impossible to calibrate the sensor to the application. In a bed occupancy detection system, switch type sensors may work in a typical box-spring bed, but may not switch and/or switch intermittently when loaded in a luxury mattress installation where the loading is better spread over the bed structure, thus limiting the amount of force applied to the sensor. Switch type sensors may not have a hysteresis band between the load and unload force and have been found to switch on/off frequently in a situation where the occupant moves frequently and/or where the application is near the force level needed to activate the switch, thus causing difficulty in analyzing and using the sensor data from the occupancy detection switch in an activity monitoring system.

DETAILED DESCRIPTION OF THE INVENTION

Figure 1:
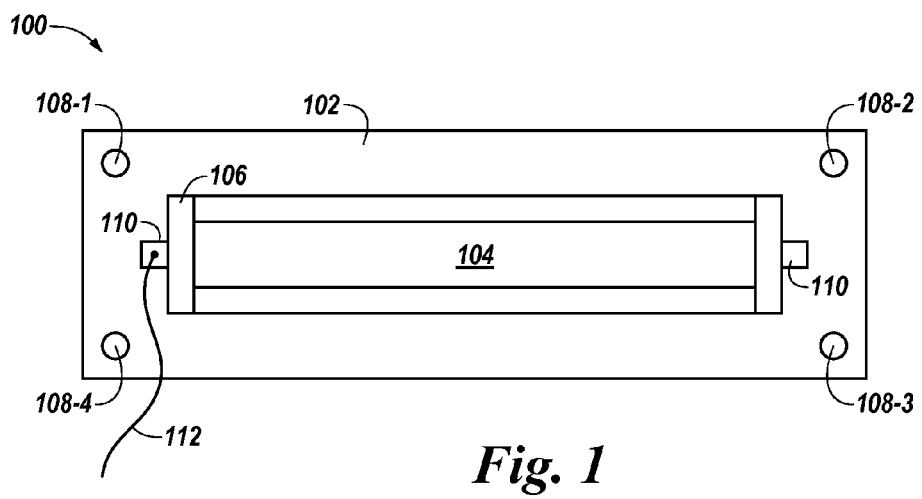
FIG. 1 illustrates an occupancy sensor according to an embodiment of the present disclosure.

Embodiments of the present disclosure relate to methods, devices, and systems for determining occupancy of a user. One method to determine occupancy of a user includes sensing a change in resistance of a sensor element of an occupancy sensor, correlating the change in resistance to a force transmitted to the occupancy sensor, and determining an occupancy status of a user based on the force transmitted.

The Figures herein follow a numbering convention in which the first digit or digits correspond to the drawing Figure number and the remaining digits identify an element or component in the drawing. Similar elements or components between different Figures may be identified by the use of similar digits.

Figure 2:
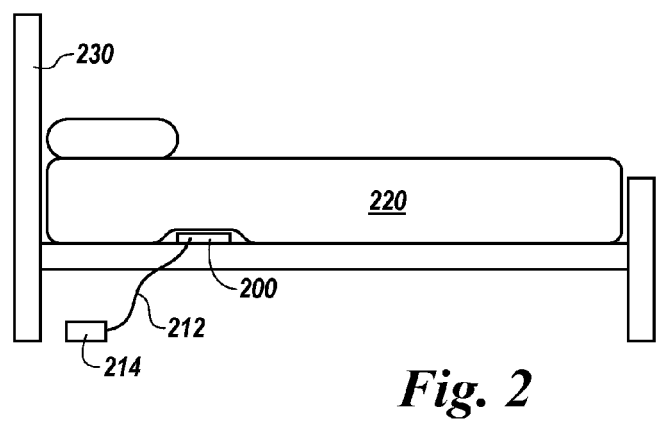
FIG. 2 illustrates an occupancy sensing system according to an embodiment of the present disclosure.

For example, 112 may reference element "12" in FIG. 1, and a similar element may be referenced as 212 in FIG. 2. As will be appreciated, elements shown in the various embodiments herein can be added, exchanged, and/or eliminated so as to provide any number of additional embodiments of the system. In addition, the elements shown in the various embodiments are not necessarily to scale.

FIG. 1 illustrates an occupancy sensor 100 according to an embodiment of the present disclosure. Occupancy sensor 100 can use a force exerted on the occupancy sensor by a user to determine the occupancy status of the user. Occupancy sensor 100 can be used to determine the occupancy status of the user in a variety of settings, such as in a bed, in a chair, and/or on the floor of a room, for example, among other settings. Occupancy sensor can be used to determine the occupancy status of a user in relation to any object that has a support structure for the occupancy sensor.

In one or more embodiments, the occupancy sensor 100 in FIG. 1 can include a sensor element 110. Sensor element 110 can be a force sensitive resistor (FSR) element. An FSR element can be a transducer having a resistance that varies based on the force exerted on the FSR element, i.e., the resistance of the FSR element varies as the force exerted on the FSR element varies. The resistance of the FSR element can, in turn, be converted to a voltage. The voltages sensed that are caused by forces exerted on the FSR element can be calibrated and correlated to the forces exerted on the FSR element, so that resistances sensed by circuitry coupled to the FSR element can be correlated to the forces exerted on the FSR element.

In one or more embodiments, the sensor element 110 can be coupled to a base 102. Base 102 can be a semi-rigid polymer base, for example, among other materials. The width of base 102 can vary so that the base is supported by a support structure on which it is placed. A base that is supported by the support structure on which it is placed can reduce variability in sensitivity of an occupancies sensitivity based on location on the structure. The semi-rigid polymer base can provide support for the sensor element 110 so that forces exerted on the sensor element 102 result in changes in resistance in the sensor element 110.

In one or more embodiments, an activator bar 104 can be placed over the sensor element 110 and be coupled to base 102. The activator bar 104 can be placed over the sensor element 110 so that a portion of the sensor element on the ends of the activator bar 104 is exposed. The exposed portion of the sensor element 110 can be used to couple the sensor element 110 to a module via a cable connector 112. A first end of cable connector 112 can be coupled to a portion of the sensor element 110 and a second end of cable connector can be coupled to a module. The cable connector 112 can transfer signals between the sensor element and the module. The module can receive and sense the variable resistances and voltages associated with the forces exerted on the sensor element 110.

The activator bar 104 can be a semi-rigid polymer with a resilient, low compression set foam rubber compound, for example, among other materials. The activator bar 104 can transfer force from the mattress and/or user to the sensor element 110. The activator bar 104 can be formed of materials with variable stiffness, so that the changes in resistance in a sensor element 110 caused by forces being transferred to the sensor element 110 by the activator bar 104 can vary based on the stiffness of the activator bar material. The width of the activator bar 104 can also affect the change in resistance in a sensor element 110 caused by forces transferred to the sensor element 110 by the activator bar 104. A wider activator bar can transfer more force to the sensor element 110 causing a greater change in resistance in the sensor element 110 than a narrower activator bar. The activator bar 104 can be surrounded by edge supports 106. The edge supports 106 can be formed of the same and/or similar material as the activator bar 104 can counteract the fixed forced exerted on the bed occupancy sensor by the weight of a static object, such as a mattress, for example, so that the sensor element 110 does not change resistance due to the weight of the static object.

In one or more embodiments, occupancy sensor 100 can include fasteners 108-1, 108-2, 108-3, and 108-4. A number of fasteners, such as fasteners 108-1, 108-2, 108-3, and 108-4 in FIG. 1, can be used to fasten the occupancy sensor 100 to a structure. Fasteners 108-1, 108-2, 108-3, and 108-4 can be grommets, among other fastening mechanisms, for example. The occupancy sensor 100 can be covered in a cleanable and/or moisture resistant cover.

In one or more embodiments, an occupancy sensor can detect a user's occupancy on an object for use with an activity monitoring system that operates by detecting periods of inactivity of a user that may indicate a need for assistance. The occupancy sensor can use a battery powered circuit for transmission of signals that indicate occupancy and/or out of bed conditions. The occupancy sensor may also be used in situations where an exit event is cause for assistance to prevent falls.

The occupancy sensor can be used in a passive monitoring system to detect periods of inactivity that may indicate a condition where assistance is needed. In activity monitoring systems, a period of sleep can exceed the time without activity alert that the activity monitoring system uses to gage assistance needs, therefore an occupancy sensor can be used to activate a sleep timer in the activity monitoring system to allow the user to rest without generating the automated alerts.

In one or more embodiments, the calibration process for an occupancy sensor can be initiated by inserting a cable connector from the sensor element into a jack on a module. The jack contains a switch to detect the insertion of a cable connector. The circuitry of the module can conduct a calibration by sampling the resistance reading from the sensor element and averaging over the calibration period to determine tare, e.g., an unloaded mattress condition. The tare result can then be used to calculate a load threshold and a corresponding unload threshold. The calculated thresholds can be chosen based on a number of factors, such as a logarithmic load/resistance characteristic of the sensor element, among other factors. In various embodiments, a resistor divider can be used in the module to scale a voltage reading that can be converted to a scaled count reading. A parallel resistor can be added to the sensor element to create an upper resistance reading, hence an upper count value for an unloaded bed sensor. A fixed resistor value in the divider network can be chosen to shift the counts scale of the microprocessor such that the difference between loaded and unloaded counts in the typical use range is sufficiently large, while reducing the current draw of the sensing element.

In various embodiments, a load threshold must be satisfied for a period of time for an occupancy sensor to detect a loaded condition. The period of time is adjustable to allow the occupancy sensor to be used to detect an exit event, e.g., fast detect, and/or an activity of daily living, where the load/unload detection time delay can be extended.

In various embodiments, the resistance level must exceed the unload threshold also for a settable period of time for the bed occupancy sensor to indicate an unload condition. Load and unload thresholds can be calculated based on the unloaded calibration, but can be adjusted remotely for a particular application if the calculated load/unload thresholds do not sufficiently allow for proper detection of occupancy status. A new calibration can be performed anytime by simply unplugging and reinserting the plug. New calibrations may be needed if an occupancy sensor is shifted during cleaning or adjustment of sensor position.

In one or more embodiments, a combination of a cable connector sense jack, and a baseline sensor element resistance can provide the module with information to determine if the cable connector is inserted and if the sensor element is reading a proper resistance level. This information can be transmitted to an activity monitoring system and can be further utilized with the load/unload readings to troubleshoot an installation.

In one or more embodiments, the sensor element of the bed occupancy sensor can use a low power circuit for monitoring bed occupancy that can be battery powered. The nature of the resistive circuit allows for rapid power up to sample the resistance value and varying the duty cycle for powering the sensing circuit allows the sensor to better optimize the battery life for the occupancy sensor. The calibration of the sensor element can be conducted without connecting to a computer device and/or other tool.

In one or more embodiments, two occupancy sensors can be installed in an area that is too large for a single occupancy sensor to properly detect occupancy, such as a queen or king size bed, for example. Also, multiple sensors can be added to a single area for increased occupancy detection assurance. A module can include a number of independent inputs and circuitry to monitor a number of occupancy sensors independently.

FIG. 2 illustrates an occupancy sensing system according to an embodiment of the present disclosure. The occupancy system in FIG. 2 can be a bed occupancy sensing system and include an occupancy sensor 200 coupled to a bed structure 230. In various embodiments, an occupancy sensing system can sense occupancy in a chair, a room, and/or a portion of a residence, for example, among other locations and/or objects.

In the occupancy sensing system of FIG. 2, bed structure 230 can be a bed frame, for example. In one or more embodiments, a bed structure can be a floor, wherein a mattress is placed on the floor of a room. A mattress 220 can be placed on the bed structure 230 and on occupancy sensor 200. The occupancy sensor 200 can be coupled to a module 214 via a cable connector 212. The occupancy sensor 200 and module 214 can be battery operated. The module 214 can sense signals transmitted from the occupancy sensor 200 via cable connector 212. The module 214 can include circuitry that can sense a resistance in the bed occupancy sensor 200 and convert the resistance sensed to a voltage. The changes in the resistance in the occupancy sensor caused by changes in force exerted on the occupancy sensor can be sensed by the module 214 and converted to a voltage that is calibrated and corresponds to the force exerted on the occupancy sensor.

In one or more embodiments, the occupancy sensor 200 can be part of an activity monitoring system that includes a number of sensors that can communicate to each other and/or a computing device. The module 214 can communicate with other sensors and/or computing devices by transmitting signals wirelessly. The signals communicated between the number of sensors and/or computing devices can be analyzed and used to monitor the activities of a user in a residence. In various embodiments, an activity monitoring system can include a number wireless access points that can provide wireless access to a wireless network, such as a Wireless Local Area Network (WLAN), by transferring signals on one or more channels between various components of the wireless network, such as sensors, base stations, and/or computing devices, among other components.

Embodiments of the present disclosure relate to methods, devices, and systems for determining bed occupancy. One method to determine occupancy of user includes sensing a change in resistance of a sensor element of an occupancy sensor, correlating the change in resistance to a force transmitted to the occupancy sensor, and determining an occupancy status of a user based on the force transmitted.

Although specific embodiments have been illustrated and described herein, those of ordinary skill in the art will appreciate that an arrangement calculated to achieve the same techniques can be substituted for the specific embodiments shown. As one of ordinary skill in the art will appreciate upon reading this disclosure, various embodiments of the invention can be performed in one or more devices, device types, and system environments including networked environments.

Combination of the above embodiments, and other embodiments not specifically described herein will be apparent to those of skill in the art upon reviewing the above description. The scope of the various embodiments of the disclosure includes other applications in which the above structures and methods can be used. Therefore, the scope of various embodiments of the disclosure should be determined with reference to the appended claims, along with the full range of equivalents to which such claims are entitled.

In the foregoing Detailed Description, various features may have been grouped together in a single embodiment for the purpose of streamlining the disclosure. This method of disclosure is not to be interpreted as reflecting an intention that the embodiments of the invention require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for determining occupancy of a user, comprising:
    transmitting a force to an occupancy sensor via an activator bar, wherein the activator bar is fixed at a first end and a second end and is coupled to a sensor element of the occupancy sensor between a first end and a second end of the sensor element, and an edge support surrounds the activator bar and wherein the occupancy sensor is between a base and the activator bar;
    sensing a change in resistance of a sensor element of the occupancy sensor;
    correlating the change in resistance to a force transmitted to the occupancy sensor; and
    determining an occupancy status of a user based on the force transmitted.

2. The method of claim 1, wherein the method includes correlating the change in resistance to a force transmitted to the occupancy sensor by converting the change in resistance to a voltage that correlates to the force transmitted.

3. The method of claim 1, wherein the method further includes calibrating an unloaded threshold and a loaded threshold of the sensor element by sensing the resistance of the sensor element and determining a force transmitted to the sensor element without a user transmitting force to the sensor element.

4. The method of claim 3, wherein the method includes determining an unoccupied status of the user when the sensing element resistance is at or above the unloaded threshold.

5. The method of claim 3, wherein the method include determining an occupied status of the user when the sensing element resistance is below the loaded threshold and has not exceeded the unloaded threshold.

6. The method of claim 3, wherein the method include determining an occupied status of the user when the sensing element resistance is below the unloaded threshold for a period of time.

7. An occupancy sensor, comprising:
    a sensing element, wherein a resistance of the sensing element is dependent on a force exerted on the sensing element;
    an activator bar, wherein an edge support surrounds the activator bar, wherein the activator bar is fixed a first end and a second end and is coupled to the sensing element between a first end and a second end of the sensing element, and wherein the occupancy sensor is between a base and the activator bar, and wherein the activator bar transmits the force to the sensing element; and
    a module, wherein the module senses the resistance of the sensing element and converts the resistance to a corresponding voltage.

8. The occupancy sensor of claim 7, wherein a cable connector couples the sensing element to the module.

9. The occupancy sensor of claim 7, wherein the module includes circuitry to sense the resistance of the sensing element and convert the resistance of the sensing element to the corresponding voltage.

10. The occupancy sensor of claim 7, wherein the sensor element is coupled to a base and the activator bar is placed over a portion of the sensor element and coupled to the base.

11. The occupancy sensor of claim 7, wherein the occupancy sensor includes a number of fasteners to couple the occupancy sensor to a structure.

12. A system for determining occupancy of a user, comprising:
    a support structure, wherein a static object is placed on the support structure; and
    an occupancy sensor, wherein the occupancy sensor includes:
        a sensing element, wherein a resistance of the sensing element is dependent on a force exerted on the sensing element;
        an activator bar, wherein the activator bar is formed of materials with variable stiffness, wherein the activator bar is fixed at a first end and a second end and is coupled to the sensing element between a first end and a second end of the sensing element, wherein the occupancy sensor is between a base and the activator bar, and wherein the activator bar transmits the force to the sensing element; and
        a module, wherein the module senses the resistance of the sensing element and converts the sensed resistance to a voltage correlating to the force exerted on the sensing element.

13. The system of claim 12, wherein the occupancy sensor is placed between the support structure and the static object.

14. The system of claim 12, wherein the module determines an occupancy status of a user based on the sensed resistance.

15. The system of claim 12, wherein the module determines an occupancy status of a user based on the force exerted on the sensing element being above or below a load or unload threshold.

16. The system of claim 12, wherein the occupancy sensor is battery powered.

17. The system of claim 12, wherein the module wirelessly transmits a signal indicating an occupancy status to a computing device.

18. The system of claim 17, wherein the occupancy sensor and the computing device wirelessly communicate with each other as part of an activity monitoring system.

* * * * *